March 22, 1960

J. F. PARKER ET AL 2,929,908

ELECTRIC KETTLES

Filed April 25, 1958

3 Sheets-Sheet 1

Jack Fordham Parker &
Clive Fordham Parker.
by Kenway, Jenney, Witter & Hildreth,
Attys.

March 22, 1960  J. F. PARKER ET AL  2,929,908
ELECTRIC KETTLES

Filed April 25, 1958  3 Sheets-Sheet 2

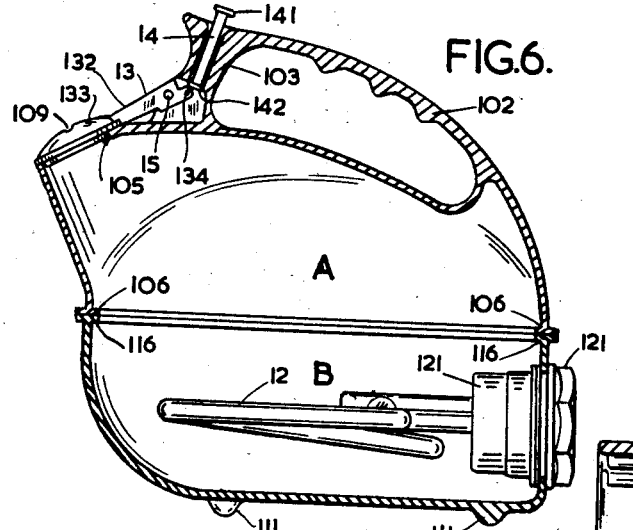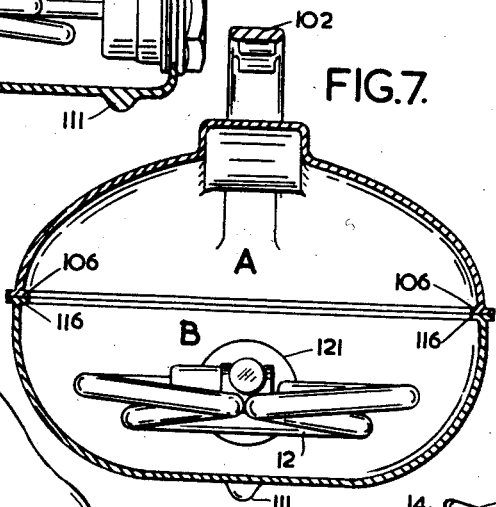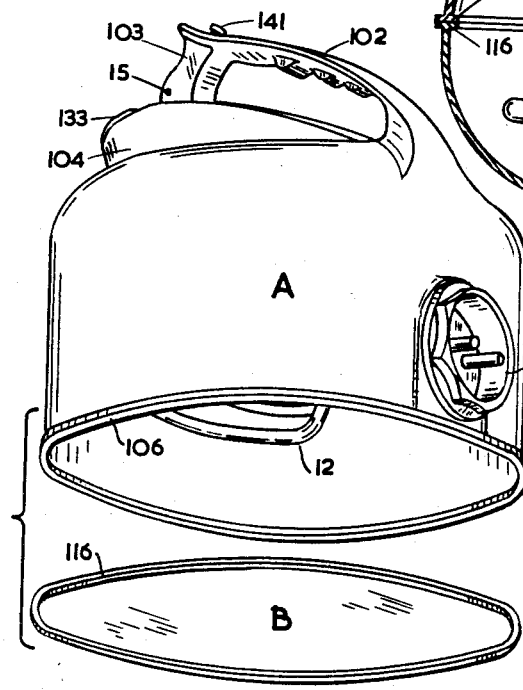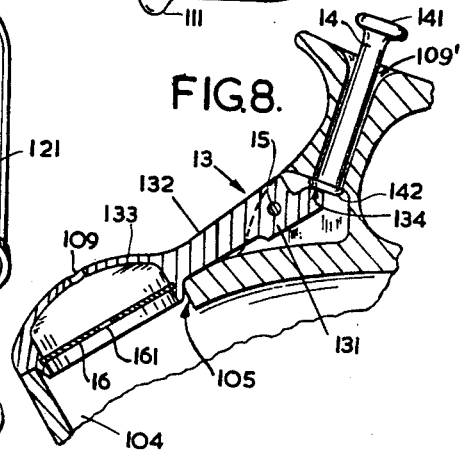

2,929,908
ELECTRIC KETTLES

Jack Fordham Parker and Clive Fordham Parker, Wolverhampton, England, assignors to Fordham Pressings Limited, Wolverhampton, England, a company with limited liability incorporated in Great Britain Application April 25, 1958, Serial No. 730,966

Claims priority, application Great Britain December 27, 1957

5 Claims. (Cl. 219—44)

This invention has reference to improvements relating to electric kettles and has for its object to provide at a relatively low cost an electric kettle which is attractive in appearance and which is comfortable to handle even when the contents are at boiling point temperature.

According to the invention the improved electric kettle comprises an upper part constituted as a hollowed one-piece moulding of a synthetic plastic material incorporating an upstanding portion arranged symmetrically about the medial longitudinal line of said upper part, a spout section formed at the front end of said upstanding portion and a longitudinal handle, the gripping portion whereof is located above and spaced from said upstanding portion and the front end of which springs from said upstanding portion, united to a lower part consttiuted by a one-piece moulding of synthetic plastic material having legs integral with the underside thereof and an electric resistance heater adapted to be mounted within one of said parts, the upstanding portion aforesaid serving to stiffen said upper part and to distribute the load when the kettle is lifted.

Figure 1:
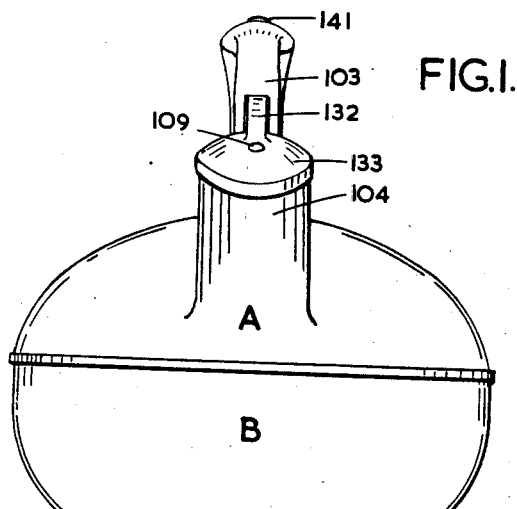
Figure 2:
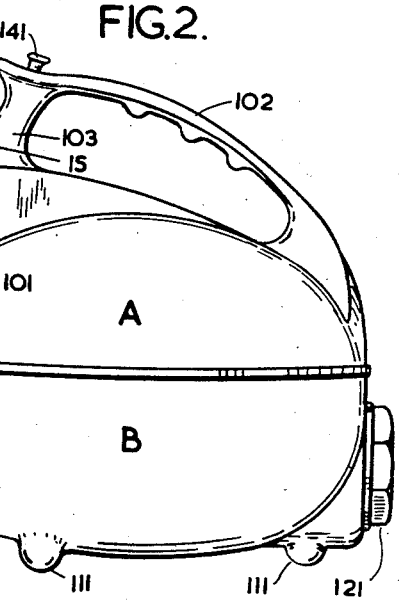
Figure 3:
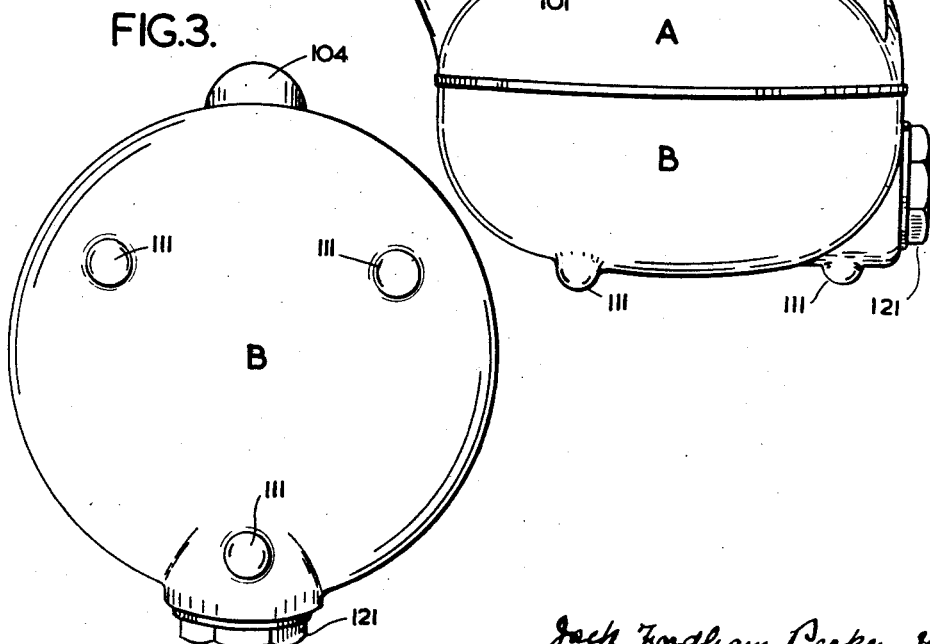
Figure 4:
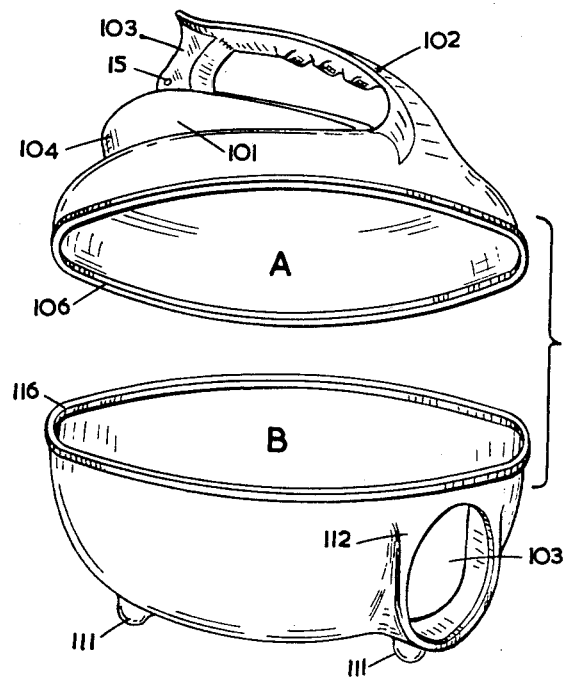
Figure 5:
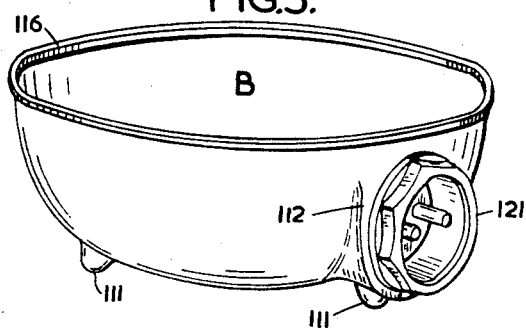

A manner of carrying the invention into effect will now be described with particular reference to the accompanying drawings wherein:

Figure 1 is a front elevation of an electric whistling kettle constructed in accordance with the invention, Figure 2 is a side elevation of Figure 1, Figure 3 is an underside plan of Figure 1, Figure 4 is a view illustrating separated the two component mouldings for use in the construction of a kettle as illustrated in Figures 1 to 3, Figure 5 is a section of the lower moulding illustrated in Figure 4 after the fitment thereto of the electric heating element, Figure 6 is a longitudinal vertical section of the kettle as illustrated in Figures 1 to 3, Figure 7 is a transverse vertical section of the kettle as illustrated in Figures 1 to 3, Figure 8 is a fragmentary view illustrating the manner of mounting and actuating the combined whistle and lid for the spout as fitted to the kettle illustrated in Figures 1 to 3, and Figure 9 is a view in perspective illustrating a modified manner of constructing an electric kettle in accordance with the invention.

In the drawings, where appropriate, like numerals of reference indicate similar parts in the several views.

According to a manner of carrying the invention into effect illustrated in Figures 1 to 8 the electric kettle is formed in two parts designated generically by the reference letters A, B each of which is consttiuted as a moulding of the synthetic plastic material known as high tensile polythene.

The moulding constituting the upper part A is of a bowl formation with a diametrical upstanding portion 101 which is of an arcuate shape when viewed in side elevation. This upstanding portion 101 is gapped or apertured symmetrically about the centre to form a handle 102 which is provided on the underside thereof with a moulded finger grip whilst the forward end of the said upstanding portion 101 is thickened and stepped as at 103 and then continued as an outwardly inclined portion 104 having therein a hole 105 which serves as a spout and is to termed hereinafter, said spout 105 being of a diameter such as to permit easy pouring and also of easy filling by way of the said spout 105.

The moulding B constituting the lower part of the body also is of a bowl formation and is provided on the underside with symmetrically arranged feet 111. The lower part also is provided at one end with an enlarged portion 112 having therein a hole 113 for the reception of and the fitment of an electric heating element 12 of standard construction.

Each part A, B is provided with an outwardly flanged rim 106 and 116 respectively and after production and fitment of the heating element the two parts A, B are brought together with the flanged rim 106 of the part A seated on the flanged rim 116 of the other part B and the two parts united by welding to form the complete kettle.

For symmetrical purposes the two parts A and B are assembled with the handle 102 and inclined portion 104 in line with the enlarged portion 112 provided for the reception of the heating element 12.

The body of the kettle when produced as aforesaid is of substantially ellipsoidal formation with the handle 102 and inclined portion projecting above the ellipsoidal portion of the upper part A.

Pivotally mounted in a recess formed in the thickened and stepped portion 103 is a lever 13 of moulded plastic the shorter arm 131 whereof projects within the recess whilst the longer arm 132 is provided with a circular end portion 133 which serves as a lid for the spout 105. The shorter arm 131 of the lever aforesaid is provided with an inclined surface 134 which cooperates with the lower end of a plastic plunger 14 which is displaceably mounted within a cylindrical hole 109' in the thickened and stepped portion 103. The plunger 14 is provided with an enlarged head 141 whilst the lower end is deformed by pressure after fitment to form a slight flange 142 which prevents dislodgement of the plunger 14.

The lever 13 is fulcrumed on a pin 15 passed through registering holes in the lower end of the thickened and stepped portion 103.

The lid forming portion 133 hereinafter called the lid 133 is provided with a hole 109 which registers with a hole 161 in a metal disc 16 embedded in the said lid 133 to constitute a whistle.

Normally the lid 103 aforesaid tends to occupy the closed position under the action of gravity but may be raised to uncover the spout 105 by depressing the plunger 14 which may be done by the thumb whilst gripping the handle 102 thereby facilitating filling and pouring.

According to the modified manner of carrying the invention into effect as illustrated in Figure 7 the body is formed in two parts A, B one part A consisting of the body proper together with the handle 102 and spout fixing portion 104 whilst the other part B is constituted as a flat or peripherally flanged bottom portion for attachment to the body part A produced as aforesaid also by welding.

If desired the upper part A in both the constructions illustrated may be apertured to provide a filling opening in which case a lid of synthetic plastic material is provided for covering and uncovering said opening as and when required.

It will be understood that the invention may be made in shapes other than those illustrated for example the body of the kettle may be made square or other conventional kettle shapes.

It will be appreciated also that owing to the poor heat conductivity of polythene an electric kettle in accordance with the invention is comfortable to handle even when the contents are boiling and does not occasion burning if the surface is touched inadvertently during boiling.

Furthermore it is found that the internal surface of the body is less subject to "furring" than an electric kettle of the same volume and electrical heating capacity made of metal.

Moreover it should be remarked that the provision of the diametrical upstanding portion 101 springing from the upper part A and the formation of the handle 10 serve to stiffen the said part A and to distribute the load when the kettle is lifted.

An electric kettle in accordance with the invention is light in weight, and, as illustrated, attractive in appearance and is capable of being produced at a relatively low cost.

We claim:

1. An electric kettle comprising an upper part constituted as a hollowed bowl-shaped one piece moulding of a synthetic plastic material incorporating an integral upstanding portion arranged symmetrically about the medial longitudinal line of said upper part, an integral spout section formed at the front end of said upstanding portion and an integral longitudinal handle the gripping portion whereof is located above and spaced from said upstanding portion and the front end of which springs from said upstanding portion, united to a lower part constituted by a one piece bowl-shaped moulding of synthetic plastic material having legs integral with the underside thereof and an electric resistance heater adapted to be mounted within one of said parts, the upstanding portion aforesaid serving to stiffen said upper bowl-shaped part and to distribute the load when the kettle is lifted.

2. An electric kettle comprising an upper part constituted as a hollowed one piece moulding of a synthetic plastic material incorporating an integral upstanding portion arranged symmetrically about the medial longitudinal line of said upper part, an integral spout section formed at the front end of said upstanding portion and an integral longitudinal handle the gripping portion whereof is located above and spaced from said upstanding portion and the front end of which springs from said upstanding portion, united to a lower part constituted as a one piece moulding of synthetic plastic material having legs integral with the underside thereof and a housing at one end thereof and an electric resistance heater the base whereof is adapted to be mounted within said housing, the upstanding portion aforesaid serving to stiffen said upper part and to distribute the load when the kettle is lifted.

3. An electric kettle comprising a hollowed dome shaped upper part constituted as a one piece moulding of a synthetic plastic material incorporating an integral upstanding portion arranged symmetrically about the medial longitudinal line of said upper part, an integral spout section formed at the front end of said upstanding portion and an integral longitudinal handle the gripping portion whereof is located above and spaced from said upstanding portion and the front end of which springs from said upstanding portion, united to a bowl-shaped lower part constituted by a one piece moulding of synthetic plastic material having legs integral with the underside thereof and an electric resistance heater adapted to be mounted within one of said parts, the upstanding portion aforesaid serving to stiffen said upper part and to distribute the load when the kettle is lifted.

4. An electric kettle comprising a hollowed dome shaped upper part constituted as a one piece moulding of a synthetic plastic material incorporating an integral upstanding portion arranged symmetrically about the medial longitudinal line of said upper part, an integral spout section formed at the front end of said upstanding portion and an integral longitudinal handle the gripping portion whereof is located above and spaced from said upstanding portion and the front end of which springs from said upstanding portion, united around the periphery to the periphery of a bowl-shaped lower part constituted as a one piece moulding of synthetic plastic material having legs integral with the underside thereof and a housing at one end thereof and an electric resistance heater adapted to be mounted within said housing, the upstanding portion aforesaid serving to stiffen said upper part and to distribute the load when the kettle is lifted.

5. An electric kettle comprising an upper part constituted as a hollowed one piece bowl-shaped moulding of synthetic plastic material incorporating an integral upstanding portion arranged symmetrically about the medial longitudinal line of said upper part, an integral spout section formed at the front end of said upstanding portion and an integral longitudinal handle the gripping portion whereof is located above and spaced from said upstanding portion and the front end of which springs from said upstanding portion and a housing at one end of said upper part, welded to a lower part constituted by a one piece moulding of synthetic plastic material having legs integral with the underside thereof and an electric resistance heater the base whereof is adapted to be mounted within said housing, the upstanding portion aforesaid serving to stiffen said upper part and to distribute the load when the kettle is lifted.

References Cited in the file of this patent

UNITED STATES PATENTS

| 1,777,909 | Brookes | Oct. 7, 1930 |
| 2,027,537 | Kircher | Jan. 14, 1936 |
| 2,501,142 | Reichart | Mar. 21, 1950 |
| 2,509,008 | McFarland | May 23, 1950 |
| 2,519,431 | Brown | Aug. 22, 1950 |
| 2,742,709 | Woodey et al. | Apr. 24, 1956 |

FOREIGN PATENTS

| 106,583 | Australia | Feb. 7, 1939 |
| 579,265 | Great Britain | July 29, 1946 |
| 770,477 | Great Britain | Mar. 20, 1957 |